(12) United States Patent
Tajima et al.

(10) Patent No.: US 8,043,533 B2
(45) Date of Patent: Oct. 25, 2011

(54) DIAMOND SINTERED COMPACT HAVING HIGH ELECTRICAL CONDUCTIVITY AND PRODUCTION METHOD THEREOF

(75) Inventors: Itsuro Tajima, Naka (JP); Akhmadi Eko Wardoyo, Naka (JP); Osamu Fukunaga, Ichikawa (JP)

(73) Assignee: Mitsubishi Materials Corporation, Tokyo (JP)

( * ) Notice: Subject to any disclaimer, the term of this patent is extended or adjusted under 35 U.S.C. 154(b) by 270 days.

(21) Appl. No.: 12/446,353

(22) PCT Filed: Oct. 26, 2007

(86) PCT No.: PCT/JP2007/070888
§ 371 (c)(1),
(2), (4) Date: Apr. 20, 2009

(87) PCT Pub. No.: WO2008/053796
PCT Pub. Date: May 8, 2008

(65) Prior Publication Data
US 2010/0320423 A1 Dec. 23, 2010

(30) Foreign Application Priority Data

Oct. 31, 2006 (JP) .................................. 2006-296902
Oct. 31, 2006 (JP) .................................. 2006-296903
Oct. 5, 2007 (JP) .................................. 2007-261682
Oct. 5, 2007 (JP) .................................. 2007-261683

(51) Int. Cl.
*H01B 1/04* (2006.01)
*H11B 1/06* (2006.01)
*B01J 3/06* (2006.01)

(52) U.S. Cl. ...................................... 252/509; 423/446
(58) Field of Classification Search .................. 252/509; 423/446
See application file for complete search history.

(56) References Cited

U.S. PATENT DOCUMENTS

| | | | |
|---|---|---|---|
| 3,148,161 A | 9/1964 | Wentorf et al. | |
| 5,266,236 A | 11/1993 | Bovenkerk | |
| 7,101,433 B2 * | 9/2006 | D'Evelyn et al. | 117/69 |
| 7,635,035 B1 * | 12/2009 | Bertagnolli et al. | 175/434 |
| 2004/0035197 A1 | 2/2004 | Meng Yue | |
| 2004/0062928 A1 * | 4/2004 | Raghavan et al. | 428/408 |
| 2004/0134415 A1 * | 7/2004 | D'Evelyn et al. | 117/84 |
| 2006/0096521 A1 * | 5/2006 | D'Evelyn et al. | 117/2 |

FOREIGN PATENT DOCUMENTS

| | | |
|---|---|---|
| EP | 0 537 004 A1 | 4/1993 |
| JP | A-04-114966 | 4/1992 |
| JP | 04-312982 A | 11/1992 |
| JP | 05-194031 A | 8/1993 |
| JP | 05-213700 A | 8/1993 |
| JP | 09-142932 A | 6/1997 |
| JP | 2795738 B2 | 6/1998 |
| JP | 11-292630 A | 10/1999 |
| JP | 2004-193522 A | 7/2004 |
| JP | 2005-290403 A | 10/2005 |
| JP | 2006-502955 A | 1/2006 |
| JP | A-2009-091179 | 4/2009 |
| WO | WO 2004/035197 A1 | 4/2004 |

OTHER PUBLICATIONS

European Search Report mailed Mar. 3, 2011 for the corresponding European patent application No. 07830622.2.

* cited by examiner

*Primary Examiner* — Douglas Mc Ginty
(74) *Attorney, Agent, or Firm* — Leason Ellis LLP

(57) ABSTRACT

The present invention is to provide a diamond sintered compact having good conductivity together with the characteristics, such as hardness, thermal conductivity, thermal resistance, chemical stability, almost equal to those of a natural diamond. A boron-doped diamond sintered compact having good conductivity and high thermal resistance is produced by a sintering process, in which 90 to 99.9 wt. % of a boron-doped diamond powder and 0.1 to 10% wt. % of a powder comprising, one or more of carbonates including Mg, Ca, Sr or Ba, and/or one or more of composite carbonates composed by two or more of these elements, as a bonding phase component, are sintered together under Ht/HP conditions, and the bonding phase component melts and then fills into the space between the boron-doped diamond powder particles.

6 Claims, No Drawings

US 8,043,533 B2

DIAMOND SINTERED COMPACT HAVING HIGH ELECTRICAL CONDUCTIVITY AND PRODUCTION METHOD THEREOF

CROSS REFERENCED TO RELATED APPLICATION

This is a U.S. national phase application under U.S.C. §371 of International Patent Application No. PCT/2007/070888, filed Oct. 26, 2007 and claims the benefit of Japanese Application No. 2006-296902, filed Oct. 31, 2006; Japanese Application No. 2006-296903, filed Oct. 31, 2006; Japanese Application No. 2007-261682, filed Oct. 5, 2007 and Japanese Application No. 2007-261683, filed Oct. 5, 2007. The International Application was published in Japanese on May 8, 2008 as International Publication No. WO/2008/053796 under PCT Article 21(2). The contents of the above applications are incorporated herein in their entirety.

TECHNICAL FIELD

The present invention relates to a production method to produce diamond sintered compacts having high electrical conductivity, in an effective and simplified manner; the invention also relates to a production method for producing boron-doped diamond sintered compacts having an excellent thermal resistance.

BACKGROUND OF THE INVENTION

Since, diamonds have inherent characteristics as high hardness, high thermal conductivity, high thermal resistance, and excellent chemical stability;
diamonds have been utilized for many applications, such as, abrasion resistance materials, electronic device/sensor materials, biotechnological materials, and optical materials. Widely applied methods to produce diamonds are; the vapor-phase synthesis method using various kinds of CVD processes, and/or a synthesis method using an ultrahigh pressure/high temperature (HP/HT) apparatus.

It is well known that diamonds are inherently non-conductive material. However, in recent years, the boron-doped diamond has attracted notice due to its semiconductor characteristics. The following are known examples of producing the boron-doped diamond; the vapor-phase synthesis method in which a small amount of boron components are added to a reaction gas while synthesizing the diamond; and the HP/HT synthesis method in which under the conditions of a pressure in the range of 5 to 10 GPa and a temperature in the range of 1300 to 2000° C., the diamond is synthesized from graphite powder and boron powder as the material powders.

Also, since diamonds inherently have characteristics such as hardness and abrasion resistance, thus diamond sintered compacts are used in various cutting tools. Such diamond sintered compacts are generally produced by sintering under HP/HT conditions. The following are known examples of producing the diamond sintered compact: a method in which the diamond-Co (cobalt) based sintered compact is produced from diamond powder and Co powder as material powders; the material powders are sintered in the HP/HT apparatus under the conditions of a pressure of about 5.5 GPa and a temperature of about 1500° C. Another method in which the diamond-ceramics based sintered compact is produced from diamond powder, Ti (titanium) powder, Zr (zirconium) powder and Cr (chromium) powder as material powders; the material powders are sintered in the HP/HT apparatus under the conditions of a pressure of 6.5 GPa or higher and a temperature in the range of 1700 to 1900° C., then further heated up at a temperature of 2000° C. or higher: and a method in which the diamond-carbonate based sintered compact is produced from diamond powder and carbonate powder as material powders; the material powders are sintered in the HP/HT apparatus under the conditions of a pressure in the range of 6 to 12 GPa and a temperature in the range of 1700 to 2500° C.

Known references are: Japanese Patent Publication No. 2004-193522; Japanese Patent Publication No. H04-312982; Japanese Translation of PCT Publication No. 2006-502955; Japanese Patent Publication No. H05-194031; and Japanese Patent No. 2,795,738.

The inherent characteristics of the diamond sintered compact have been utilized widely. For example, the aforementioned conventional art refers to a diamond-Co based sintered compact that has electrical conductivity, since the bonding phase in the diamond-Co based sintered compact consists of Co metal. So this diamond-Co based sintered compact has an advantage that the electrical discharge machining process is usable for machining this diamond-Co based sintered compact, but also has the disadvantage of low thermal resistance. On the other hand, the aforementioned conventional art refers to a diamond-carbonate based sintered compact that has the advantage of excellent thermal resistance; but due to its non-conductivity, the electrical discharge machining process is not usable for machining this diamond-carbonate based sintered compact. Therefore, there is a problem that only the laser beam machining process is usable for machining this diamond-carbonate based sintered compact. Hence, in conventional arts, it is very difficult to obtain a diamond sintered compact having both good electrical conductivity and other inherent characteristics of a diamond, such as hardness, thermal conductivity, thermal resistance and chemical stability. This is one of the limitations which prevent wide application of the diamond sintered compact.

The present invention relates to obtaining a diamond sintered compact, having both good conductivity and other characteristics of a natural diamond, such as, hardness, thermal conductivity, thermal resistance and chemical stability. The present invention also relates to a simplified and effective production method for the diamond sintered compact.

SUMMARY OF THE INVENTION

In order to solve the aforementioned problems, the inventers conducted intensive research on producing diamond sintered compacts, concerning both the material powders and the sintering methods; and found the following (a) to (d).

(a) Starting material powders for the sintered compact are: a boron-doped diamond powder made by doping a small amount of boron component in a diamond; and as a component for forming a bonding phase in the sintered compact, a powder comprising, one or more of carbonates including alkaline earth metal elements, Mg (magnesium), Ca (calcium), Sr (strontium) or Ba (barium), and/or one or more of composite carbonates including two or more of these elements. Hereafter, this powder is called an alkaline earth metal carbonate powder. A composite material powder, which has a layer structure of these starting material powders, or is a mixture of these starting material powders; is sintered under a HP/HT condition. The alkaline earth metal carbonate powder melts at a temperature of about 2300° C.; and then a boron-doped diamond sintered compact, in which the space between the boron-doped diamond powder particles is filled with the alkaline earth metal carbonate powder, is produced by this process.

(b) Starting material powders for the sintered compact are: a diamond powder; a boron powder; and as a component for forming a bonding phase in the sintered compact, a powder comprising, one or more of carbonates including alkaline earth metal elements, Mg, Ca, Sr or Ba, and/or one or more of composite carbonates including two or more of these elements. Hereafter, this powder is called an alkaline earth metal carbonate powder. Predetermined quantities of these starting material powders are mixed to make a composite material powder. Sintering is preformed under HP/HT conditions in two steps; as the first step, a diffusion process is conduced, in which the boron in the mixed composite material powder is diffused into the diamond powder under predetermined pressure and predetermined temperature, as the second step, the alkaline earth metal carbonate powder as the bonding phase component, melts under higher pressure and higher temperature than the previous step, and then fills the space between the boron-diffused diamond powder particles. Thus, a diamond sintered compact having good electric conductivity is produced by this process.

(c) A natural diamond inherently has very low electric conductivity of $10^{-5}$ S/cm or less. On the other hand, boron-doped diamond powders have remarkably high electric conductivity of about 1.5 S/cm. Although the aforementioned diamond-carbonate based sintered compact in the conventional art has low electric conductivity of about $10^{-5}$ S/cm; the boron-doped diamond sintered compacts produced by the method (a), and the diamond sintered compact produced by the method (b), have an electric conductivity in the range of about 1.0 to $10^{-2}$ S/cm. Since this value is roughly equivalent to the about $2\times10^{-2}$ S/cm which is the electrical conductivity of the aforementioned diamond-Co based sintered compact; the products by (a) and (b) have good electrical conductivity sufficient for machining by the electrical discharge machining process.

(d) Sintered compacts, such as a diamond-Co based sintered compact, containing metal component as the bonding phase component, has limited thermal resistance of about 700° C. On the other hand, the boron-doped diamond sintered compact produced by the method (a) and the diamond sintered compact produced by the method (b) have thermal resistance of about 1200° C., almost equivalent to the excellent thermal resistance of the carbonate based diamond sintered compact produced by using a natural diamond as raw material. Also, the products by (a) and (b) have good hardness, good thermal conductivity and good chemical stability.

The present invention is based on the aforementioned (a) to (d), and has the features detailed in the following: A boron-doped diamond sintered compact wherein: a quantity in the range of from 90 to 99.9 weight % of a boron-doped diamond powder in which the range of from 1 to 10 wt-% of boron component is doped, and a quantity in the range of from 0.1 to 10 wt-% of an alkaline earth metal carbonate powder including: one or more of carbonates including alkaline earth metal elements Mg, Ca, Sr or Ba, and/or one or more of composite carbonates including two or more of these elements, as a bonding phase component in this sintered compact; these powders are sintered together under HP/HT conditions; and then the bonding phase component melts and fills the space between the boron-doped diamond powder particles.

A production method for a boron-doped diamond sintered compact wherein: the starting material powders are; a quantity in the range of from 90 to 99.9 wt-% of a boron-doped diamond powder in which the range of from 1 to 10 wt-% of boron component is doped, and a quantity in the range of from 0.1 to 10 wt-% of an alkaline earth metal carbonate powder having, one or more of carbonates including alkaline earth metal elements Mg, Ca, Sr or Ba, and/or one or more of composite carbonates including two or more of these elements, as a bonding phase component in this sintered compact; these starting material powders are sintered together in a HP/HT apparatus, under the conditions of a pressure in the range of from 6.0 to 9.0 GPa and a temperature in the range of from 1600 to 2500° C.; and then the bonding phase component melts and fills the space between the boron-doped diamond powder particles.

A production method for a diamond sintered compact having good electrical conductivity wherein: a composite material powder is a mixture of a quantity of diamond powder in the range of from 80 to 99.4 wt-%, a quantity of boron powder in the range of from 0.5 to 15 wt-%, and a quantity in the range of from 0.1 to 10 wt-% of an alkaline earth metal carbonate powder including one or more of carbonates including alkaline earth metal elements Mg, Ca, Sr or Ba, and/or one or more of composite carbonates including two or more of these elements, as a bonding phase component in the sintered compact; and the composite material powder is sintered in the HP/HT apparatus, as the first step of this production process, the boron component in the composite material powder is diffused into the diamond powder under the conditions of a pressure in the range of from 5.0 to 8.0 GPa and a temperature in the range of from 1300 to 1800° C., after that as the second step, the bonding phase component melts under the conditions of a pressure in the range of from 6.0 to 9.0 GPa and a temperature in the range of from 1600 to 2500° C., and then fills the space between the boron-doped diamond powder particles.

DETAILED DESCRIPTION OF THE PRESENT INVENTION

In an aspect of the present invention, the boron-doped diamond powder and its production method are described as follows: Boron-doped diamond powder A boron-doped diamond powder produced by well known methods, for example the vapor-phase synthesis method or the HP/HT synthesis method, is utilizable as a starting material powder. Although the quantity of the doped boron is not particularly restricted, but from a practical viewpoint, the preferable range is from 1 to 10 wt-%. In other words, the solution of the equation, (Boron Weight)/[(Boron Weight)+(Diamond Weight)]×100, should be within a range of 1 to 10 wt-%, more preferably within a range of from 2 to 7 wt-%.

Alkaline earth carbonate powder. Starting material powders; a boron-doped diamond powder, and an alkaline earth metal carbonate powder comprising, one or more of carbonates including alkaline earth metal elements, Mg, Ca, Sr or Ba, and/or one or more of composite carbonates including two or more of these elements; are sintered together under HP/HT conditions. Under the condition of a temperature of about 2300° C., the alkaline earth metal carbonate powder melts, and then fills the space between the diamond powder particles. Hence, the alkaline earth metal carbonate powder aids to bond each adjacent diamond particles together, fills the space between the particles, and becomes the bonding phase for increasing the density of the sintered compact.

Combination ratio of the starting material powders. The ratio of the boron-doped diamond powder is in a range of from 90 to 99.9 wt-%. This range aims to give the boron-doped diamond sintered compact of the present invention high electric conductivity together with the excellent inherent characteristics of a diamond, namely, hardness, thermal conductivity and chemical stability. On the other hand, the ratio of the alkaline earth metal carbonate powder is in a range of from 0.1 to 10 wt-%. This range aims also to give the boron-doped diamond sintered compact of the present invention excellent thermal resistance together with the predetermined high electric conductivity and the predetermined density of the sintered compact. If the ratio of the boron-doped diamond powder is less than 90 wt-%, or the ratio of the alkaline earth metal carbonate powder is more than 10 wt-%; the boron-doped diamond sintered compact will not have the predetermined high electric conductivity, and its characteristics as a sintered compact, namely, density, hardness, thermal conductivity and chemical stability, also will become poor. On the other hand, if the ratio of the alkaline earth metal carbonate powder is less than 0.1 wt-%, or the ratio of the boron-doped diamond powder is more than 99.9 wt-%; due to the decrease of the bonding phase component, the characteristics of the sintered compact, namely, sinterability, strength and thermal resistance, will become poor.

Sintering conditions of the HP/HT apparatus. A sintered compact, produced in the HP/HT apparatus under a pressure lower than 6.0 GPa, has insufficient densification. A sintered compact, produced in the HP/HT apparatus at a pressure of 9.0 GPa, has practically sufficient densification. The cost of a HP/HT apparatus having a function over 9.0 GPa operating pressure is very expensive. Therefore, the pressure is determined in a range of from 6.0 to 9.0 GPa. If the heating temperature of the HP/HT apparatus is lower than 1600° C., the carbonate does not completely melt and fill the space between the particles; since the sintering reaction is insufficient, the resulting sintered compact has not high density. On the other hand, if the heating temperature of the HP/HT apparatus is higher than 2500° C.; the temperature becomes excessive for sintering the powders: under this condition, the diamond powder is undesirably inverted to graphite. Therefore, the heating temperature range of from 1600 to 2500° C. is determined. The composite material powders for placing in the HP/HT apparatus should preferably be a layer structure of the boron-doped diamond powder and the alkaline earth metal carbonate powder. Or, a mixture of the boron-doped diamond powder and the alkaline earth metal carbonate powder is usable as the composite material powder for placing in the HP/HT apparatus.

In another aspect of the present invention, the method for producing the diamond sintered compact is described as follows: Diamond powder and boron powder A diamond powder produced by the vapor-phase synthesis method or other well known methods is utilizable as the diamond powder for this method. A crystalline boron powder or an amorphous boron powder is suitable as the boron powder for this method. However, in some cases, a boron carbide powder with high boron content is also utilizable as the boron powder for this method. The HP/HT conditions, on the first step of this method, are of a pressure in the range of from 5.0 to 8.0 GPa and a temperature in the range of from 1300 to 1800° C. Under these conditions, boron component in this boron powder is diffused over the surface of the diamond powder. Therefore, the diamond powder, produced by this process, has the property which contributes to the electrical conductivity of the finished diamond sintered compact.

Alkaline earth carbonate powder. A mixture of the diamond powder, the boron powder and the alkaline earth carbonate powder becomes the composite material powder to be sintered under HP/HT conditions. The sintering is preformed under HP/HT conditions in the below two steps. As the first step, the conditions are of a pressure in the range of from 5.0 to 8.0 GPa and a temperature in the range of from 1300 to 1800° C. Under these conditions, the boron component is diffused into the diamond. As the second step, the conditions are of a pressure in the range of from 6.0 to 9.0 GPa and a temperature in the range of from 1600 to 2500° C. Under these conditions, the bonding phase component melts, fills the space between the boron-doped diamond powder particles, and becomes the bonding phase for increasing the density of the sintered compact.

Combination ratio of the starting material powders. The ratio of the boron-doped diamond powder is in a range of from 80 to 99.4 wt-%, and the ratio of the boron powder is in a range of from 0.5 to 15 wt-%. These ranges aim to give the diamond sintered compact of the present invention high electric conductivity together with the excellent inherent characteristics of a diamond, namely, hardness, thermal conductivity and chemical stability. Concurrently, the ratio of the alkaline earth metal carbonate powder is in a range of from 0.1 to 10 wt-%. This range aims to give the diamond sintered compact of the present invention high electric conductivity together with excellent thermal resistance and predetermined density of the sintered compact. If the ratio of the diamond powder is less than 80 wt-%, or the ratio of the boron powder is less than 0.5 wt-%, or the ratio of the alkaline earth metal carbonate powder is more than 10 wt-%; the diamond sintered compact will not have the predetermined high electric conductivity; and its characteristics as a sintered compact, namely, hardness, thermal conductivity, chemical stability and density, also will become poor.

Alternatively, if the ratio of the alkaline earth metal carbonate powder is less than 0.1 wt-%, or the ratio of the boron-doped diamond powder is more than 99.4 wt-%, or the ratio of the boron powder is more than 15 wt %; due to the decrease of the bonding phase component, the characteristics of the sintered compact, namely, sinterability, strength and thermal resistance, will become poor. Additionally, a case; wherein the diamond powder, the boron powder and the alkaline earth carbonate powder are not directly mixed, but the boron-doped diamond powder beforehand synthesized by the method shown in the cited prior arts and the alkaline earth metal carbonate powder are mixed; can be supposed as a process for making a combination of the starting material powders. However, in this case, the above boron-doped diamond tends to contain impurities which are remains of metal catalysts used in its synthesizing process. This causes an adverse effect to the finished sintered compact's characteristics: for example, thermal resistance becomes poor. Furthermore, this synthesized boron-doped diamond forms lumps. Therefore, after synthesizing this boron-doped diamond, the lumps have to be crushed, and then the remaining metal impurities have to be removed by chemical treatments, then it divided into classes. This subsequent processing takes much time. Therefore, a combination of the diamond powder, the boron powder and the alkaline earth carbonate powder by each their pre-determined ratio, is have to be used as the composite material powder for the sintered compact. By using this combination as the composite material powder for the sintered compact; the diamond particles become free from the impurities, and also the subsequent processing is not needed. Additionally, the ratio of diamond and boron in the sintered compact can be controlled easily and accurately by changing the combination ratio of the starting material powders.

Sintering conditions in the HP/HT apparatus. As the first step of the sintering process in the HP/HT apparatus, the conditions are of a pressure in the range of from 5.0 to 8.0 GPa and a temperature in the range of from 1300 to 1800° C. Under these conditions, the boron component is diffused into the diamond powder. This process contributes to the electrical conductivity of the diamond sintered compact. If the pressure and/or the heating temperature are lower than the above ranges, the boron component is not sufficiently diffused, thus leading to poor conductivity of the sintered compact.

On the other hand, if the pressure and/or the heating temperature are higher than the above ranges; the carbonate component start to melt, and then the diamond is undesirably sintered, although the boron diffusion phase has not been fully formed. Therefore, a pressure in the range of from 5.0 to 8.0 GPa and a heating temperature in the range of from 1300 to 1800° C. are determined as the conditions for the first step of the sintering process. As the second step of the sintering process in the HP/HT apparatus, a sintered compact, produced under a pressure lower than 6.0 GPa, has insufficient densification; and a sintered compact, produced at a pressure of 9.0 GPa, has sufficient densification. The cost of a HP/HT apparatus having a function over 9.0 GPa operating pressure is very expensive. From these factors, the pressure is determined in the range of from 6.0 to 9.0 GPa. If the heating temperature is lower than 1600° C., the alkaline earth metal carbonate does not completely melt and fill the space between the particles; the sintering reaction is also insufficient, the resulting sintered compact has not high density.

On the other hand, if the heating temperature is higher than 2500° C.; the temperature becomes excessive for sintering the powders; under this condition, the diamond particles are undesirably changed to graphite. Therefore, the heating temperature has been determined in the range of from 1600 to 2500° C. In the present invention, the composite material powder for placing in the HP/HT apparatus should preferably be a simple mixture of the diamond powder, the boron powder and the alkaline earth metal carbonate powder. However, a composite material powder; which is not only a simple mixture of the starting material powders, but has a layer structure of each starting material powder, the diamond powder, the boron powder and the alkaline earth metal carbonate powder; is also usable for placing in the HP/HT apparatus.

In the present invention relating to the boron-doped diamond sintered compact and it's production method: the boron-doped diamond powder and the alkaline earth metal carbonate powder for forming the bonding phase in the sintered compact are heated together under a HP/HT condition; the bonding phase component melts, and then fills the space between the boron-doped diamond powder particles; and the boron-doped diamond sintered compact thus produced, has not only good hardness, good thermal conductivity and good chemical stability, has but also good electrical conductivity and good thermal resistance.

Furthermore, the diamond powder, the boron powder and the alkaline earth metal carbonate powder for forming the bonding phase in the sintered compact; are heated under HP/HT condition. As the first step, boron is diffused into the diamond to give the sintered compact an electrical conductivity. As the second step, the bonding phase component melts, and then fills the space between the boron-doped diamond powder particles. Thus, the diamond sintered compact with good electric conductivity is obtained by a simple and effective two step process.

The actual examples of the boron-doped diamond powders and the alkaline earth metal carbonate powders used in the invention are shown in Table 1.

EXAMPLE 1

Table 1 shows the starting material powders, namely, various boron-doped diamond powders and various alkaline earth metal carbonate powders. Table 2 shows the composite material powders 1 to 13 prepared by making the combinations of the starting material powders shown in Table 1, and their combination ratios. The composite material powders 1 to 13 were placed into a general belt type HP/HT apparatus, in a layer structure where the alkaline earth metal carbonate powder[s] was[were] located at a lower layer and the boron-doped diamond powder was located at an upper layer. Next, these composite material powders 1 to 13 were sintered under the sintering conditions (A) to (D) shown in Table 3. Then, the boron-doped diamond sintered compacts of this invention were produced as the invention sintered compacts 1 to 15 shown in Table 4. The measured characteristics of these invention sintered compacts 1 to 15, namely, electrical conductivity (electrical resistance), thermal resistance, hardness, thermal conductivity and chemical stability, are also shown in Table 4.

COMPARATIVE EXAMPLE 1

The composite material powders 21 to 24 for comparison shown in Table 5 were prepared. The composite material powders 21 and 23 were in a layer structure where the bonding phase component powders were located at a lower layer and the diamond powder was located at an upper layer. The composite material powders 22 and 24 were simple mixtures of the diamond powder and the bonding phase component powder. These composite material powders 21 to 24 were placed into a general belt type HP/HT apparatus, and then sintered under the sintering conditions (E) and (F) shown in Table 6. Thus, the diamond sintered compacts for comparison were produced as the comparative sintered compacts 21 to 24 shown in Table 7. The measured characteristics of the comparative sintered compacts 21 to 24 are also shown in Table 7.

In Example 1 and Comparative Example 1; the evaluation tests for the characteristics, namely, electrical conductivity (electrical resistance), thermal resistance and chemical stability; have been performed as follows.

Electrical conductivity evaluation test:

Four-point method was applied for measuring electrical conductivity of the samples.

Thermal resistance evaluation test:

The samples were heated in a vacuum furnace at the temperature of 800° C. for 30 minutes and then at the temperature of 1200° C. for 30 minutes. After these heating processes, XRD (X-ray) analysis was conduced for checking whether there was graphite (which is an inverse form of diamond) in the samples.

Chemical stability evaluation test:

The samples were soaked in heated fluoric acid at the temperature of 150° C. for 2 hours. After this chemical treatment, a visual inspection was conduced for checking whether any shape deformation occurred in the sample sintered compacts.

TABLE 1

| Kind of powder | Powder symbol | Mean diameter of particle [μm] |
|---|---|---|
| Boron-doped powder | BD (1) | 0.5 |
|  | BD (2) | 3 |
|  | BD (3) | 8 |
| Alkaline earth carbonate powder | $MgCO_3$ | 30 |
|  | $CaCO_3$ | 50 |
|  | $SrCO_3$ | 30 |
|  | $BaCO_3$ | 30 |
|  | $(Mg, Ca)CO_3$ | 50 |
|  | $(Mg, Sr)CO_3$ | 50 |

Note:
The doped quantities of boron in BD (1) to BD (3) are respectively 2 wt %, 4 wt % and 7 wt %.

TABLE 2

| Composite material powder symbol | Boron-doped diamond powder Powder symbol | Boron-doped diamond powder Combination ratio [wt %] | Alkaline earth carbonate powder Powder symbol | Alkaline earth carbonate powder Combination ratio [wt %] | Alkaline earth carbonate powder Powder symbol | Alkaline earth carbonate powder Combination ratio [wt %] |
|---|---|---|---|---|---|---|
| 1 | BD (1) | 90 | MgCO$_3$ | 5 | BaCO$_3$ | 5 |
| 2 | BD (1) | 97 | MgCO$_3$ | 3 | — | — |
| 3 | BD (1) | 90 | CaCO$_3$ | 2 | MgCO$_3$ | 8 |
| 4 | BD (2) | 98 | MgCO$_3$ | 2 | — | — |
| 5 | BD (2) | 95 | (Mg, St)CO$_3$ | 5 | — | — |
| 6 | BD (2) | 90 | SrCO$_3$ | 5 | BaCO$_3$ | 5 |
| 7 | BD (3) | 95 | CaCO$_3$ | 5 | — | — |
| 8 | BD (3) | 95 | MgCO$_3$ | 2 | BaCO$_3$ | 3 |
| 9 | BD (3) | 95 | (Mg, Ca)CO$_3$ | 5 | — | — |
| 10 | BD (3) | 95 | (Mg, St)CO$_3$ | 3 | (Mg, Ca)CO$_3$ | 2 |
| 11 | BD (2) | 99.9 | CaCO$_3$ | 0.1 | — | — |
| 12 | BD (3) | 99 | MgCO$_3$ | 0.5 | CaCO$_3$ | 0.5 |
| 13 | BD (1) | 99.5 | SrCO$_3$ | 0.5 | — | — |

TABLE 3

| Sintering condition symbol | Pressure [GPa] | Temperature rise rate [° C./min.] | Temperature [° C.] | Heat holding time [min.] |
|---|---|---|---|---|
| (A) | 8 | 200 | 2300 | 30 |
| (B) | 8 | 200 | 2000 | 30 |
| (C) | 7 | 200 | 1700 | 30 |
| (D) | 6 | 200 | 1600 | 30 |

Note:
Temperature [° C.] was hold while Heat holding time [min.].

TABLE 4

| Sintered compact symbol | Composite material powder symbol | Sintering condition symbol | Electrical resistance [Ω · cm] | Thermal resistance | Hardness [GPa] | Thermal conductivity [cal/cm · sec · ° C.] | Chemical stability |
|---|---|---|---|---|---|---|---|
| Invention sintered compact 1 | 1 | (A) | 10 | No graphite | 65 | 1.7 | ○ |
| Invention sintered compact 2 | 2 | (A) | 0.8 | No graphite | 68 | 1.9 | ○ |
| Invention sintered compact 3 | 3 | (A) | 13 | No graphite | 66 | 1.7 | ○ |
| Invention sintered compact 4 | 4 | (B) | 3 | No graphite | 70 | 2.0 | ○ |
| Invention sintered compact 5 | 5 | (B) | 12 | No graphite | 68 | 1.7 | ○ |
| Invention sintered compact 6 | 6 | (B) | 15 | No graphite | 66 | 1.7 | ○ |
| Invention sintered compact 7 | 7 | (C) | 65 | No graphite | 63 | 1.8 | ○ |
| Invention sintered compact 8 | 8 | (C) | 70 | No graphite | 65 | 1.5 | ○ |
| Invention sintered compact 9 | 9 | (C) | 34 | No graphite | 62 | 1.8 | ○ |
| Invention sintered compact 10 | 10 | (C) | 48 | No graphite | 66 | 1.8 | ○ |
| Invention sintered compact 11 | 11 | (A) | 1 | No graphite | 70 | 1.8 | ○ |
| Invention sintered compact 12 | 12 | (B) | 23 | No graphite | 68 | 1.8 | ○ |

TABLE 4-continued

| Sintered compact symbol | Composite material powder symbol | Sintering condition symbol | Electrical resistance [Ω·cm] | Thermal resistance | Hardness [GPa] | Thermal conductivity [cal/cm·sec·°C.] | Chemical stability |
|---|---|---|---|---|---|---|---|
| Invention sintered compact 13 | 13 | (C) | 56 | No graphite | 68 | 1.8 | ○ |
| Invention sintered compact 14 | 3 | (D) | 60 | No graphite | 45 | 1.7 | ○ |
| Invention sintered compact 15 | 11 | (D) | 14 | No graphite | 49 | 1.8 | ○ |

Note:
Symbol ○ in Chemical stability section means that these sintered compacts were with no occurrence of shape deformation through the chemical stability evaluation test.

TABLE 5

| Composite material powder symbol | Diamond powder | | Bonding phase component | | | | | |
|---|---|---|---|---|---|---|---|---|
| | Mean diameter of particle [μm] | Combination ratio [wt %] | Component | Mean diameter of particle [μm] | Combination ratio [wt %] | Component | Mean diameter of particle [μm] | Combination ratio [wt %] |
| 21 | 8 | 95 | Co | 1.5 | 5 | — | — | — |
| 22 | 30 | 90 | Co | 1.5 | 10 | — | — | — |
| 23 | 8 | 95 | $MgCO_3$ | 20 | 3 | $BaCO_3$ | 40 | 2 |
| 24 | 30 | 90 | $MgCO_3$ | 40 | 5 | $BaCO_3$ | 20 | 5 |

TABLE 6

| Sintering condition symbol | Pressure [GPa] | Temperature rise rate [°C./min.] | Temperature [°C.] | Heat holding time [min.] |
|---|---|---|---|---|
| (E) | 6 | 200 | 1600 | 30 |
| (F) | 8 | 200 | 2200 | 30 |

Note:
Temperature [°C.] was hold while Heat holding time [min.].

TABLE 7

| Sintered compact symbol | Composite material powder symbol | Sintering condition symbol | Electrical resistance [Ω·cm] | Thermal resistance | Hardness [GPa] | Thermal conductivity [cal/cm·sec·°C.] | Chemical stability |
|---|---|---|---|---|---|---|---|
| Comparative sintered compact 21 | 21 | (E) | 0.8 | Graphite | 54 | 1.8 | X |
| Comparative sintered compact 22 | 22 | (E) | 30 | Graphite | 56 | 1.7 | X |
| Comparative sintered compact 23 | 23 | (F) | Immeasurable | No graphite | 68 | 1.8 | ○ |
| Comparative sintered compact 24 | 24 | (F) | Immeasurable | No graphite | 70 | 1.9 | ○ |

Note 1:
Symbol ○ in Chemical stability section means that these sintered compacts were with no occurrence of shape deformation through the chemical stability evaluation test. Symbol X means that these sintered compacts became powdered by flowing of Co phase.
Note 2:
Immeasurable means that their electrical resistances were very high, almost same that of a natural diamond. I.e., their electrical conductivities were less than $10^{-5}$ [S/cm].

The measured characteristics of the present invention sintered compacts 1 to 15 on Table 4 show obvious facts that these present invention sintered compacts 1 to 15 have; good electric conductivity lower than 70 Ω·cm, good thermal resistance with no occurrence of graphite through the thermal resistance evaluation test, good chemical stability with no occurrence of shape deformation through the chemical stability evaluation test, and furthermore good hardness and good thermal resistance almost equal to those of a diamond.

On the other hand, the measured characteristics of the comparative sintered compacts 21 to 24 on Table 7 show obvious facts that the comparative sintered compacts 21 and 22 have good electrical conductivity, but have poor thermal resistance due to occurrence of graphite through the thermal resistance evaluation test. Also, the chemical stabilities of the 21 and 22 are poor while the chemical stability evaluation test, Co phase as the bonding phase was flowing out and then the sintered compacts became powdered. Additionally, the comparative sintered compacts 23 and 24 have very high electrical resistances too high to measure, which are almost same level of a natural diamond. In other words, the 23 and 24 have no electrical conductivity. Therefore, the diamond sintered compact having both good electric conductivity and good thermal resistance, is obtained by the present invention. Additionally the electrical discharge machining process is possible to use for machining this diamond sintered compact. As this diamond sintered compact will be finding wide application in various industrial fields, the practical effects brought by the present invention are very significant.

EXAMPLE 2

Table 8 shows the starting material powders, namely, various diamond powders, various boron powders, and various alkaline earth metal carbonate powders. Table 9 shows the composite material powders 31 to 45 prepared by making the combinations of the starting material powders shown in Table 8, and their combination ratios. The composite material powders 31 to 45 were placed into a general belt type HP/HT apparatus. Next, to produce the products of the invention methods 31 to 45, these composite material powders 31 to 45 were sintered under the sintering conditions (G) to (K) including each first sintering step and each second sintering step shown in Table 10. Then, the diamond sintered compacts of this invention were produced as the invention sintered compacts 31 to 45 shown in Table 11. The measured characteristics of these invention sintered compacts 31 to 45 which are respectively products of the invention methods 31 to 45, such as electrical conductivity (electrical resistance), thermal resistance, hardness, thermal conductivity and chemical stability, are also shown in Table 11.

EXAMPLE 2

The aforementioned composite material powders 31, 35 and 40 were sintered under the sintering conditions shown in Table 12 as the comparative methods 31, 35 and 40. Thus, the diamond sintered compacts for comparison were produced as the comparative sintered compacts 31, 35 and 40 shown in Table 13. The measured characteristics of these comparative sintered compacts are also shown in Table 13. Furthermore, as references, the measured characteristics of the prior sintered compact 1 and 2 are also shown in Table 13. The prior sintered compact 1 is a boron-doped diamond sintered compact produced by the prior method 1 in Japanese Patent Publication No. 2006-502955. The prior sintered compact 2 is a diamond-carbonate based sintered compact produced by the prior method 2 in Japanese Patent No. 2,795,738.

In Example 2 and Comparative Example 2; the evaluation tests for the characteristics, namely, electrical conductivity (electrical resistance), thermal resistance and chemical stability; have been performed as follows.

Electrical conductivity evaluation test:

Four-point method was applied for measuring electrical conductivity of the samples.

Thermal resistance evaluation test:

The samples were heated in a vacuum furnace at the temperature of 800° C. for 30 minutes and then at the temperature of 1200° C. for 30 minutes. After these heating processes, XRD (X-ray) analysis was conduced for checking whether there was graphite (which is an inverse form of diamond) in the samples.

Chemical stability evaluation test:

The samples were soaked in heated fluoric acid at the temperature of 150° C. for 2 hours. After this chemical treatment, a visual inspection was conduced for checking whether any shape deformation occurred in the sample sintered compacts.

TABLE 8

| Kind of powder | Powder symbol | Mean diameter of particle [μm] |
| --- | --- | --- |
| Diamond powder | D (1) | 1.0 |
| | D (2) | 3.0 |
| | D (3) | 8.0 |
| Boron-doped powder | B (1) | 0.5 |
| | B (2) | 3.0 |
| | B (3) | 8.0 |
| Alkaline earth carbonate powder | $MgCO_3$ | 30 |
| | $CaCO_3$ | 50 |
| | $SrCO_3$ | 30 |
| | $BaCO_3$ | 30 |
| | $(Mg, Ca)CO_3$ | 50 |
| | $(Mg, Sr)CO_3$ | 50 |

TABLE 9

| Composite material powder symbol | Diamond powder | | Boron powder | | Alkaline earth metal carbonate powder | | | |
| --- | --- | --- | --- | --- | --- | --- | --- | --- |
| | Powder symbol | Combination ratio [wt %] | Powder symbol | Combination ratio [wt %] | Powder symbol | Combination ratio [wt %] | Powder symbol | Combination ratio [wt %] |
| 31 | D (1) | 90 | B (1) | 5 | $MgCO_3$ | 3 | $BaCO_3$ | 2 |
| 32 | D (2) | 93 | B (1) | 4 | $MgCO_3$ | 3 | — | — |
| 33 | D (3) | 90 | B (1) | 4 | $CaCO_3$ | 2 | $MgCO_3$ | 4 |
| 34 | D (4) | 97 | B (2) | 2 | $CaCO_3$ | 1 | — | — |
| 35 | D (5) | 96 | B (2) | 2 | $SrCO_3$ | 1 | $MgCO_3$ | 1 |
| 36 | D (6) | 94 | B (2) | 3 | $(Mg, Ca)CO_3$ | 3 | — | — |
| 37 | D (7) | 95 | B (3) | 2 | $MgCO_3$ | 2 | $CaCO_3$ | 1 |
| 38 | D (8) | 90 | B (3) | 4 | $(Mg, Sr)CO_3$ | 6 | — | — |
| 39 | D (9) | 92 | B (3) | 6 | $BaCO_3$ | 2 | — | — |
| 40 | D (10) | 98 | B (3) | 1 | $CaCO_3$ | 1 | — | — |
| 41 | D (11) | 99.4 | B (1) | 0.5 | $MgCO_3$ | 0.1 | — | — |
| 42 | D (12) | 88 | B (1) | 2 | $(Mg, Ca)CO_3$ | 10 | — | — |

TABLE 9-continued

| Composite material powder symbol | Diamond powder | | Boron powder | | Alkaline earth metal carbonate powder | | | |
|---|---|---|---|---|---|---|---|---|
| | Powder symbol | Combination ratio [wt %] | Powder symbol | Combination ratio [wt %] | Powder symbol | Combination ratio [wt %] | Powder symbol | Combination ratio [wt %] |
| 43 | D (13) | 85 | B (2) | 12 | $CaCO_3$ | 2 | $MgCO_3$ | 1 |
| 44 | D (14) | 83 | B (2) | 8 | $SrCO_3$ | 9 | — | — |
| 45 | D (15) | 80 | B (3) | 15 | $BaCO_3$ | 3 | $CaCO_3$ | 2 |

TABLE 10

| Sintering condition symbol | Temperature rise rate [° C./min.] | First sintering step | | | Temperature rise rate [° C./min.] | Second sintering step | | |
|---|---|---|---|---|---|---|---|---|
| | | Pressure [GPa] | Temperature [° C.] | Heat holding time [min.] | | Pressure [GPa] | Temperature [° C.] | Heat holding time [min.] |
| (G) | 200 | 5.5 | 1600 | 30 | 200 | 7 | 2000 | 15 |
| (H) | 200 | 6.5 | 1600 | 30 | 200 | 8 | 2200 | 20 |
| (I) | 200 | 7 | 1700 | 30 | 200 | 8 | 2000 | 20 |
| (J) | 200 | 5.0 | 1300 | 30 | 200 | 6 | 2300 | 20 |
| (K) | 200 | 8.0 | 1800 | 30 | 200 | 8 | 2300 | 20 |

Note:
Temperature [° C.] was hold while Heat holding time [min.].

TABLE 11

| Sintered compact symbol | Composite material powder symbol | Sintering condition symbol | Electrical resistance [Ω·cm] | Thermal resistance | Hardness [GPa] | Thermal conductivity [cal/cm·sec·° C.] | Chemical stability |
|---|---|---|---|---|---|---|---|
| Invention sintered compact 31 | 31 | (G) | 14.7 | No graphite | 64 | 1.7 | ○ |
| Invention sintered compact 32 | 32 | (G) | 2.3 | No graphite | 65 | 1.9 | ○ |
| Invention sintered compact 33 | 33 | (G) | 21 | No graphite | 64 | 1.7 | ○ |
| Invention sintered compact 34 | 34 | (I) | 0.8 | No graphite | 70 | 1.8 | ○ |
| Invention sintered compact 35 | 35 | (I) | 8.4 | No graphite | 69 | 1.8 | ○ |
| Invention sintered compact 36 | 36 | (I) | 3.5 | No graphite | 66 | 1.7 | ○ |
| Invention sintered compact 37 | 37 | (H) | 18.1 | No graphite | 68 | 1.8 | ○ |
| Invention sintered compact 38 | 38 | (H) | 12.9 | No graphite | 62 | 1.5 | ○ |
| Invention sintered compact 39 | 39 | (H) | 0.5 | No graphite | 64 | 1.7 | ○ |
| Invention sintered compact 40 | 40 | (H) | 30 | No graphite | 70 | 1.8 | ○ |
| Invention sintered compact 41 | 41 | (J) | 1.0 | No graphite | 62 | 1.8 | ○ |
| Invention sintered compact 42 | 42 | (J) | 1.2 | No graphite | 60 | 1.8 | ○ |
| Invention sintered compact 43 | 43 | (J) | 5.4 | No graphite | 63 | 1.7 | ○ |

TABLE 11-continued

| Sintered compact symbol | Composite material powder symbol | Sintering condition symbol | Electrical resistance [Ω · cm] | Thermal resistance | Hardness [GPa] | Thermal conductivity [cal/cm · sec · °C.] | Chemical stability |
|---|---|---|---|---|---|---|---|
| Invention sintered compact 44 | 44 | (K) | 4.8 | No graphite | 65 | 1.6 | ○ |
| Invention sintered compact 45 | 45 | (K) | 12 | No graphite | 66 | 1.9 | ○ |

Note:
Symbol ○ in Chemical stability section means that these sintered compacts were with no occurrence of shape deformation through the chemical stability evaluation test.

TABLE 12

| Comparative methods | Composite material powder symbol | Temperature rise rate [°C./min.] | First sintering steps | | | | Temperature rise rate [°C./min.] | Second sintering steps | | |
|---|---|---|---|---|---|---|---|---|---|---|
| | | | Pressure [GPa] | Temperature [°C.] | Heat holding time [min.] | | | Pressure [GPa] | Temperature [°C.] | Heat holding time [min.] |
| Comparative method 31 | 31 | — | — | — | — | 200 | 6.5 | 1800 | 20 | |
| Comparative method 35 | 35 | 200 | 5.5 | 1800 | 20 | — | — | — | — | |
| Comparative method 40 | 40 | 200 | 3.7 | 2000 | 30 | 200 | 5.5 | 2300 | 30 | |

Note:
Temperature [°C.] was hold while Heat holding time [min.].

TABLE 13

| Sintered compact symbol | Electrical resistance [Ω · cm] | Thermal resistance | Hardness [GPa] | Thermal conductivity [cal/cm · sec · °C.] | Chemical stability |
|---|---|---|---|---|---|
| Comparative sintered compact 31 | $0.7 \times 10^4$ | Graphite | 35 | 1.2 | X |
| Comparative sintered compact 35 | $6 \times 10^6$ | Graphite | 28 | 0.7 | X |
| Comparative sintered compact 40 | $1.6 \times 10^6$ | Graphite | 30 | 1.1 | X |
| Prior sintered compact 1 | 58 | No graphite | 55 | 1.8 | Δ |
| Prior sintered compact 2 | Immeasurable | No graphite | 68 | 1.7 | ○ |

Note 1:
Symbol ○ in Chemical stability section means that these sintered compacts were with no occurrence of shape deformation through the chemical stability evaluation test. Symbol X means that binding phases in these sintered compacts flowed out due to their weak bonding forces. Symbol Δ means that binding phases in these sintered compacts partly flowed out.
Note 2:
Immeasurable means that their electrical resistances were very high, almost same that of a natural diamond. I.e., their electrical conductivities were less than 10−5 [S/cm].

On comparison between: Table 11 in which the characteristics of the present invention sintered compacts 31 to 45 are shown; and Table 13 in which the characteristics of the comparative sintered compacts 31, 35 and 40, and the characteristics of the prior sintered compact 1 and 2, are shown; the following facts become obvious. The present invention sintered compacts 31 to 45, which are respectively products of the inventive methods 31 to 45, have good electric conductivity, good thermal resistance, and furthermore good hardness and good thermal resistance almost equal to those of a natural diamond.

On the other hand, concerning the comparative sintered compacts 31, 35 and 40, and the prior sintered compact 1 and 2; at least one of their characteristics, namely, electrical conductivity, thermal conductivity, thermal resistance, hardness and chemical stability, is worse than that of the present invention sintered compacts 31 to 45. The comparative sintered compacts 31, 35 and 40 are respectively products of the comparative methods 31, 35 and 40, in which their production conditions are outside those of the invention methods. The prior sintered compact 1 and 2, are respectively products of the prior methods 1 and 2. Therefore, the diamond sintered compact having both good electric conductivity and good thermal resistance is obtained by the present invention in an effective and simplified manner. Additionally, the diamond sintered compact produced by the present invention conditions have good electrical conductivity enough for the electrical discharge machining process is possible to use for machining these diamond sintered compacts. As this diamond sintered compact will be finding wide application in various industrial fields, the practical effects brought by the present invention are very significant.

The boron-doped diamond sintered compact and its production method in the aspect 1 of the present invention teach the following. The boron-doped diamond powder and the alkaline earth carbonate powder containing the component for forming the bonding phase in the sintered compact, are sintered together under HP/HT condition: under this condition, the bonding phase component melts and fills the space between the boron-doped diamond powder particles; and then the boron-doped diamond sintered compact is produced. This boron-doped diamond sintered compact has good characteristics, namely, good hardness, good thermal conductivity and good chemical stability. Additionally, this boron-doped diamond sintered compact has good electrical conductivity and good thermal resistance. Therefore, this boron-doped diamond sintered compact has the characteristics almost equal to those of natural diamonds, together with an excellent machinability that the electrical discharge machining process is easily possible to use for machining this boron-doped diamond sintered compact. As this diamond sintered compact will be finding wide application in various industrial fields, the practical effects brought by the present invention are very significant.

The production method of the diamond sintered compact in another aspect of the present invention is the following. The diamond powder, the boron powder and the alkaline earth carbonate powder containing the component for forming the bonding phase in the sintered compact, are sintered together under HP/HT condition: as the first step of this process, the boron is diffused into the diamond to give it an electrical conductivity; as the second step, the bonding phase component melts and fills the space between the boron-doped diamond powder particles; and then the diamond sintered compact having good electric conductivity is produced by this simple and effective two step process. Therefore, the diamond sintered compact produced by this aspect 2 of the present invention has good electrical conductivity as well as good thermal resistance. Additionally, this sintered compact has the good characteristics, namely, good hardness, good thermal conductivity and good chemical stability, almost equal to those of natural diamonds. Thereby, this diamond sintered compact has an excellent machinability that the electrical discharge machining process is easily possible to use for machining this diamond sintered compact. As this boron-doped diamond sintered compact will be expecting wide application in various industrial fields, the practical effects brought by the present invention are very significant.

The invention claimed is:

1. A boron-doped diamond sintered compact comprising:
   a quantity in the range of from 90 to 99.9 weight % of a boron-doped diamond powder in which the range of from 1 to 10 wt-% of boron component is doped, and
   a quantity in the range of from 0.1 to 10 wt-% of an alkaline earth metal carbonate powder acting as a bonding phase component in this sintered compact, comprising:
   one or more carbonates including alkaline earth metal elements Mg (magnesium), Ca (calcium), Sr (strontium) or Ba (barium); and/or
   one of more composite carbonates including two or more of the alkaline earth metal elements;
   wherein the boron-doped diamond powder and the alkaline earth metal carbonate powder are sintered together under HP/HT conditions at a pressure from 6.0 to 9.0 GPa and a temperature is from 1600 to 2500° C.; and
   wherein the bonding phase component melts and fills space between the boron-doped diamond powder particles.

2. A production method for a boron-doped diamond sintered compact comprising the steps of:
   providing a quantity in the range of from 90 to 99.9 wt-% of a boron-doped diamond powder in which the range of from 1 to 10 wt-% of boron component is doped,
   providing a quantity in the range of from 0.1 to 10 wt-% of an alkaline earth metal carbonate powder acting as a bonding phase component in this sintered compact comprising one or more carbonates including alkaline earth metal elements Mg (magnesium), Ca (calcium), Sr (strontium) or Ba (barium), and/or one or more composite carbonates including two or more of the alkaline earth metal elements; and
   sintering these boron-doped diamond powder and the alkaline earth metal carbonate powder together in a HP/HT apparatus, under the conditions of a pressure in the range of from 6.0 to 9.0 GPa and a temperature in the range of from 1600 to 2500° C.; wherein the bonding phase component melts and fills space between the boron-doped diamond powder particles.

3. A production method for a diamond sintered compact having good electrical conductivity comprising the steps of:
   providing a mixture of a quantity of diamond powder in the range of from 80 to 99.4 wt-% and a quantity of boron powder in the range of from 0.5 to 15 wt-%, and
   providing a quantity in the range of from 0.1 to 10 wt-% of an alkaline earth metal carbonate powder as a bonding phase component in the sintered compact comprising one or more carbonates including alkaline earth metal elements Mg (magnesium), Ca (calcium), Sr (strontium) or Ba (barium), and/or one or more composite carbonates including two or more of the alkaline earth metal elements,;
   sintering in HP/HT apparatus the diamond, boron, and alkaline earth metal carbonate powder such that the boron component in the mixture is diffused into the diamond powder under the conditions of a pressure in the range of from 5.0 to 8.0 GPa and a temperature in the range of from 1300 to 1800° C., and melting the bonding phase component under the conditions of a pressure in the range of from 6.0 to 9.0 GPa and a temperature in the range of from 1600 to 2500° C., such that the bonding phase fills space between the boron-doped diamond powder particles.

4. A boron-doped diamond sintered compact according to claim 1, wherein the compact has electric conductivity of 70 Ω·cm or lower.

5. A boron-doped diamond sintered compact according to claim 1, wherein the compact produces no graphite after being heated in a vacuum furnace at a temperature of 800° C. for 30 minutes and then at a temperature of 1200° C. for 30 minutes.

6. A boron-doped diamond sintered compact according to claim 1, wherein the compact presents no shape deformation after being soaked in heated fluoric acid at a temperature of 150° C. for 2 hours.

* * * * *